(12) United States Patent
Emberling et al.

(10) Patent No.: US 12,645,751 B2
(45) Date of Patent: Jun. 2, 2026

(54) CONVOLUTIONAL NEURAL NETWORK OPERATIONS

(71) Applicant: Advanced Micro Devices, Inc., Santa Clara, CA (US)

(72) Inventors: Brian Emberling, Santa Clara, CA (US); Michael Mantor, Orlando, FL (US); Michael Y. Chow, Santa Clara, CA (US); Bin He, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1195 days.

(21) Appl. No.: 17/489,734

(22) Filed: Sep. 29, 2021

(65) Prior Publication Data

US 2023/0097279 A1 Mar. 30, 2023

(51) Int. Cl.
*G06F 17/15* (2006.01)
*G06F 9/38* (2018.01)
*G06F 17/16* (2006.01)

(52) U.S. Cl.
CPC ............ *G06F 17/15* (2013.01); *G06F 9/3887* (2013.01); *G06F 17/16* (2013.01); *G06F 2207/4824* (2013.01)

(58) Field of Classification Search
CPC ............... G06F 9/3001; G06F 9/30025; G06F 9/30036; G06F 9/3887; G06F 9/3888; G06F 9/3893; G06F 7/5443; G06F 15/8007; G06F 15/8053; G06N 3/063
See application file for complete search history.

(56) References Cited

U.S. PATENT DOCUMENTS

| | | | |
|---|---|---|---|
| 9,792,125 B2 | 10/2017 | Greiner et al. | |
| 11,029,949 B2 | 6/2021 | Henry et al. | |
| 11,113,061 B2 | 9/2021 | Bedy | |
| 2015/0100758 A1* | 4/2015 | Rogers | ................. G06F 9/3851 |
| | | | 712/22 |
| 2018/0121386 A1 | 5/2018 | Chen et al. | |
| 2019/0171448 A1 | 6/2019 | Chen et al. | |
| 2019/0324746 A1* | 10/2019 | Maiyuran | ................. G06T 1/20 |
| 2021/0081774 A1 | 3/2021 | Barik et al. | |
| 2021/0089316 A1* | 3/2021 | Rash | ..................... G06F 9/3802 |
| 2021/0294711 A1 | 9/2021 | Malladi et al. | |
| 2022/0309124 A1* | 9/2022 | Mei | ..................... G06F 15/8046 |
| 2022/0405556 A1* | 12/2022 | Lichtenau | ........... G06F 9/30036 |

* cited by examiner

*Primary Examiner* — Matthew D Sandifer
(74) *Attorney, Agent, or Firm* — Volpe Koenig

(57) ABSTRACT

Methods and systems are disclosed for executing operations on single-instruction-multiple-data (SIMD) units. Techniques disclosed perform a dot product operation on input data during one computer cycle, including convolving the input data, generating intermediate data, and applying one or more transitional operations to the intermediate data to generate output data. Aspects described, wherein the input data is an input to a layer of a convolutional neural network and the generated output data is the output of the layer.

20 Claims, 9 Drawing Sheets

100A

100B

200

300

400

500

600

700

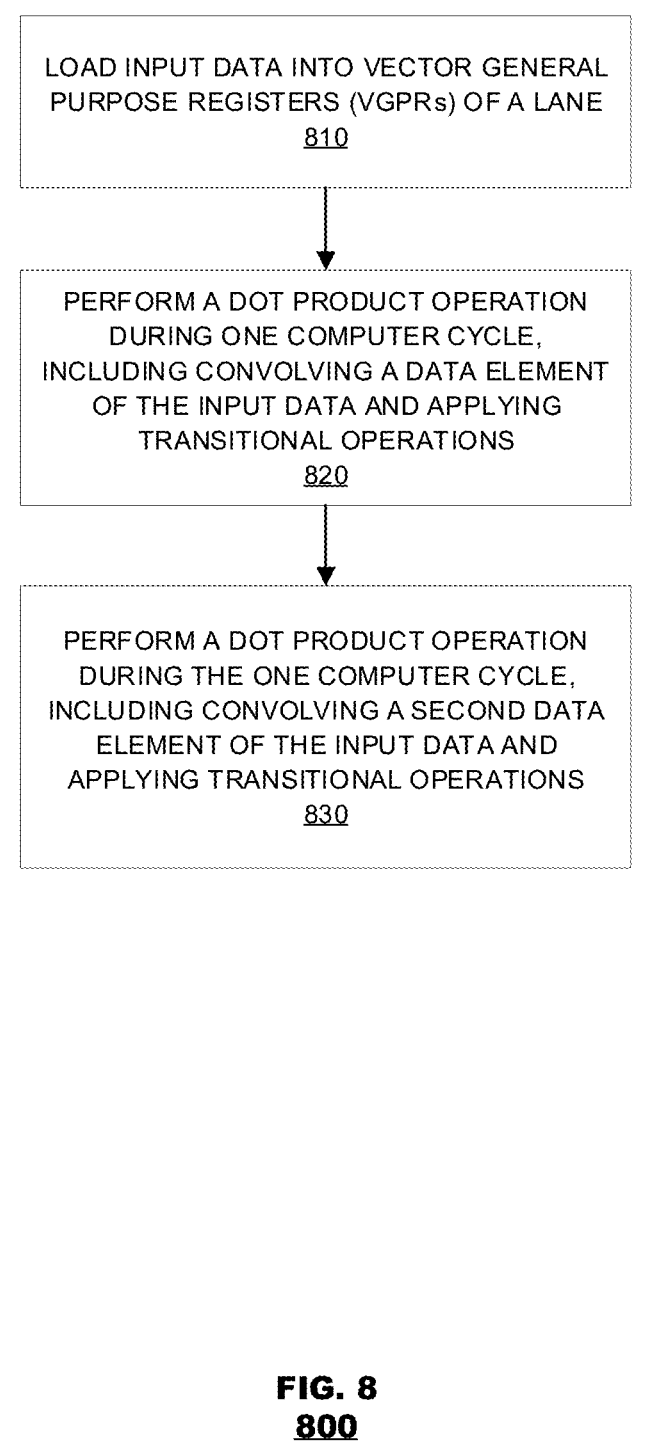

LOAD INPUT DATA INTO VECTOR GENERAL
PURPOSE REGISTERS (VGPRs) OF A LANE
810

PERFORM A DOT PRODUCT OPERATION
DURING ONE COMPUTER CYCLE,
INCLUDING CONVOLVING A DATA ELEMENT
OF THE INPUT DATA AND APPLYING
TRANSITIONAL OPERATIONS
820

PERFORM A DOT PRODUCT OPERATION
DURING THE ONE COMPUTER CYCLE,
INCLUDING CONVOLVING A SECOND DATA
ELEMENT OF THE INPUT DATA AND
APPLYING TRANSITIONAL OPERATIONS
830

FIG. 8
800

CONVOLUTIONAL NEURAL NETWORK OPERATIONS

BACKGROUND

Various computational tasks involve the processing of multi-dimensional data in multiple stages. For example, convolutional neural networks (CNN) are typically arranged in an architecture of multiple layers. In each layer, a computational operation may be applied to the layer's input, such as a convolution operation on an input image. In such a case, the resulting convolved image (or intermediate image) may be further processed by transitional operations to generate the layer's output. The transitional operations may include reformatting, rectifying, and/or clamping the intermediate image to prepare it for processing by the next layer. However, these transitional operations consume significant time relative to the time it takes to perform the computational operation itself (e.g., the convolution). Techniques are needed to increase the execution efficiency of transitional operations employed by multilayer processing architecture.

BRIEF DESCRIPTION OF THE DRAWINGS

A more detailed understanding may be had from the following description, given by way of example in conjunction with the accompanying drawings wherein:

FIG. 8 is a flow chart of an example method for the application of a dual dot product instruction, based on which one or more features of the disclosure can be implemented.

DETAILED DESCRIPTION

Figure 1A:
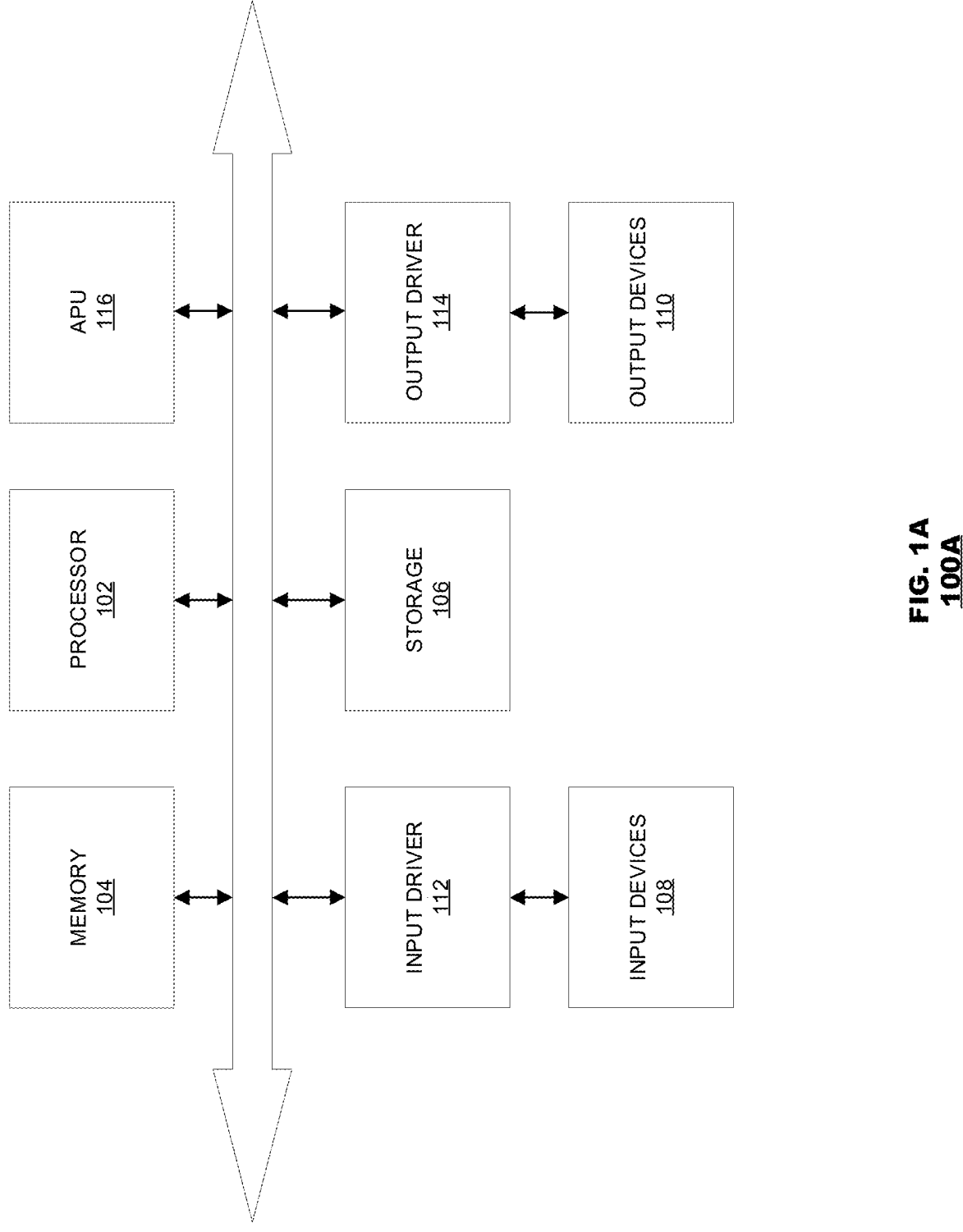
FIG. 1A is a block diagram of an example device, based on which one or more features of the disclosure can be implemented.

System and methods are disclosed in the present application that employ dot product operations, including transitional operations, for example, convolution operations that are applied to input data of a CNN's layer to generate the CNN's layer output. Dot product instructions disclosed herein can be executed concurrently with respect to two elements of the input data to generate dual output data, namely dual dot product instructions. A dual dot product instruction is executable during one computer cycle and can be performed by lanes of waves executed in parallel by SIMD units. These lanes utilize vector general purpose registers (VGPRs) to store data required for the execution of respective dot product instructions. As disclosed herein, each lane can also access data that is stored in another lane's VGPRs in order to execute a dot product instruction.

Aspects disclosed herein describe methods for executing operations on SIMD units. The methods can comprise loading, by a lane of a wave executing on a SIMD unit, input data into VGPRs of the lane, and, then, performing, by the lane, a dot product operation during one computer cycle, generating output data. The performed dot product operation can comprise convolving a data element of the input data, generating an intermediate data element, and applying one or more transitional operations to the intermediate data element, generating an output data element of the output data. The methods can further comprise performing, by the lane, a second dot product operation during the one computer cycle. The second dot product operation can comprise convolving a second data element of the input data, generating a second intermediate data element, and applying the one or more transitional operations to the second intermediate data element, generating a second output data element of the output data.

Aspects disclosed herein also describe circuitries for executing operations on SIMD units. The circuitries can comprise at least one processor and memory storing instructions. The instructions, when executed by the at least one processor, can cause the circuitries to load, by a lane of a wave executing on a SIMD unit, input data into VGPRs of the lane and to perform, by the lane, a dot product operation during one computer cycle, generating output data. The performed dot product operation can comprise convolving a data element of the input data, generating an intermediate data element, and applying one or more transitional operations to the intermediate data element, generating an output data element of the output data. The instructions can further cause the circuitries to perform, by the lane, a second dot product operation during the one computer cycle. The second dot product operation can comprise convolving a second data element of the input data, generating a second intermediate data element, and applying the one or more transitional operations to the second intermediate data element, generating a second output data element of the output data.

Further, aspects disclosed herein describe a non-transitory computer-readable medium comprising instructions executable by at least one processor to perform methods for executing operations on SIMD units. The methods can comprise loading, by a lane of a wave executing on a SIMD unit, input data into VGPRs of the lane, and performing, by the lane, a dot product operation during one computer cycle, generating output data. The performed dot product operation can comprise convolving a data element of the input data, generating an intermediate data element, and applying one or more transitional operations to the intermediate data element, generating an output data element of the output data. The methods can further comprise performing, by the lane, a second dot product operation during the one computer cycle. The second dot product operation can comprise convolving a second data element of the input data, generating a second intermediate data element, and applying the one or more transitional operations to the second intermediate data element, generating a second output data element of the output data.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. The device 100A includes a processor 102, an accelerated processing unit (APU) 116, memory 104, storage 106, one or more input devices 108, and one or more output devices 110. The device 100A can also include an input driver 112 and an output driver 114. In an aspect, the device 100A can include additional components not shown in FIG. 1.

The processor 102 can include a central processing unit (CPU) or one or more cores of CPUs. The APU 116, representing a graphics processing unit (GPU), can include one or more cores of APUs. The processor 102 and the APU 116 may be located on the same die or on separate dies. The memory 104 can be located on the same die as the processor 102, or can be located separately from the processor 102. The memory 104 can include volatile or non-volatile memory, for example, random access memory (RAM), dynamic RAM, a cache, or a combination thereof.

The storage 106 can include fixed or removable storage, for example, a hard disk drive, a solid-state drive, an optical disk, or a flash drive. The input devices 108 can include, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output devices 110 can include, for example, a display, a speaker, a printer, a haptic feedback device, one or more lights, an antenna, or a network connection (e.g., a wireless local area network card for transmission of wireless IEEE 802 signals).

The input driver 112 communicates with the processor 102 and the input devices 108, and facilitates the receiving of input from the input devices 108 to the processor 102. The output driver 114 communicates with the processor 102 and the output devices 110, and facilitates the sending of output from the processor 102 to the output devices 110. In an aspect, the input driver 112 and the output driver 114 are optional components, and the device 100A can operate in the same manner when the input driver 112 and the output driver 114 are not present.

The APU 116 can be configured to accept compute commands and graphics rendering commands from processor 102, to process those compute and graphics rendering commands, and/or to provide output to a display (output device 110). As described in further detail below, the APU 116 can include one or more parallel processing units configured to perform computations, for example, in accordance with a SIMD paradigm. Thus, although various functionality is described herein as being performed by or in conjunction with the APU 116, in various alternatives, the functionality described as being performed by the APU 116 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 1B:
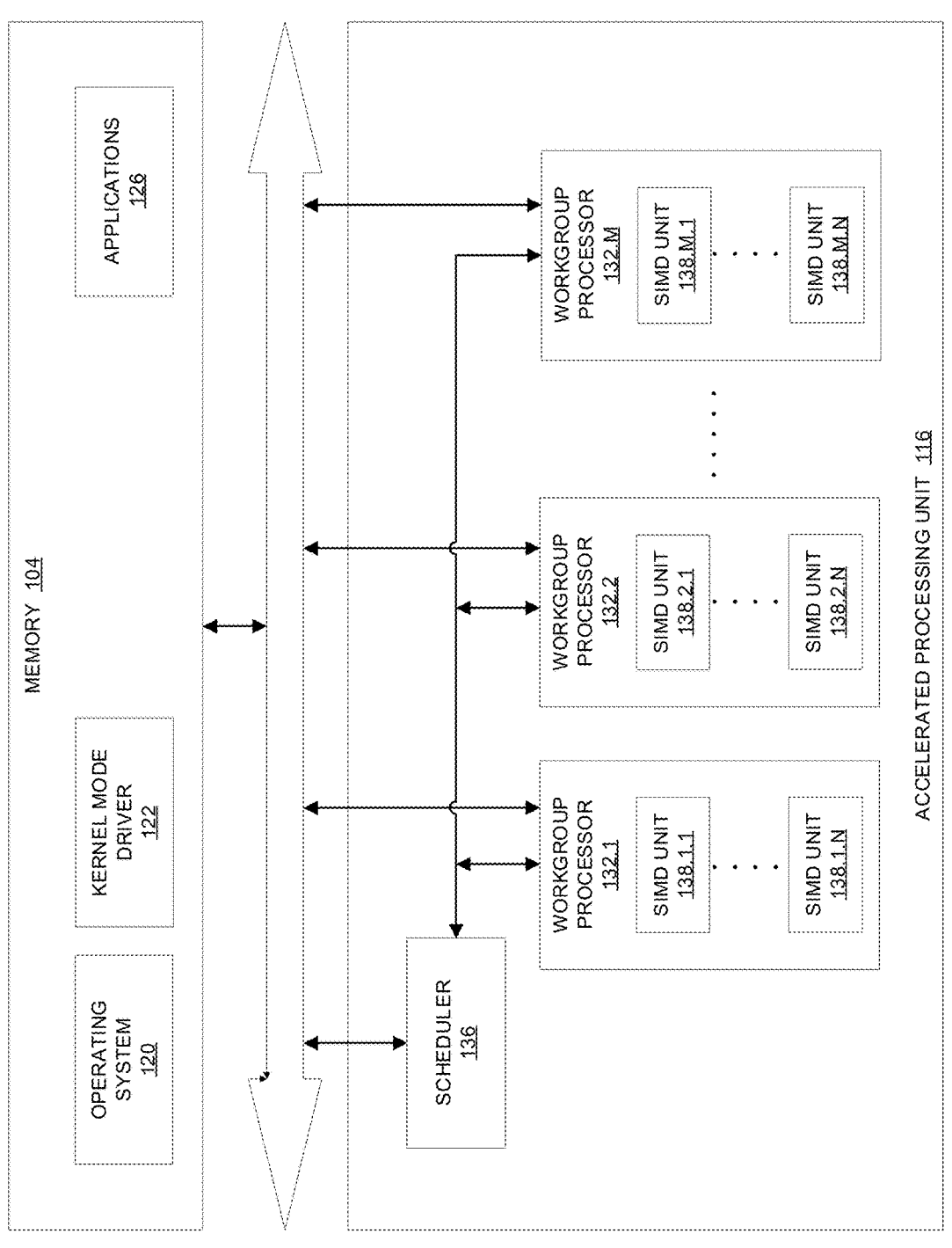
FIG. 1B is a block diagram of an example system, demonstrating an accelerator employable by the device of FIG. 1A, based on which one or more features of the disclosure can be implemented.

FIG. 1B is a block diagram of an example system 100B, employable by the device of FIG. 1A, based on which one or more features of the disclosure can be implemented. FIG. 1B illustrates in further detail the execution of processing tasks on APU 116. The processor 102 can maintain in memory 104 one or more modules for execution by the processor 102. The modules include an operating system 120, a kernel mode driver 122, and applications 126. These modules can control various features of the operation of the processor 102 and the APU 116. For example, the operating system 120 can provide system calls, that is, application programming interfaces (APIs), that can be employed by applications 126 to directly interface with the hardware. The kernel mode driver 122 can control operation of the APU 116 by, for example, providing API to applications 126 executing on the processor 102 to access various functionality of the APU 116. The kernel mode driver 122 can also include a just-in-time compiler that compiles programs for execution by processing components of the APU 116 (such as the SIMD units 138 discussed in further detail below).

The APU 116 can execute commands and programs for graphics operations and non-graphics operations, including either parallel processing or sequential processing and either ordered or non-ordered processing. The APU 116 can be used for executing graphics pipeline operations—such as operations that process pixels and/or geometric computations (e.g., rendering an image to the display (output device 110))— based on commands received from the processor 102. The APU 116 can also execute processing operations that are not related to graphics operations, such as operations related to video, physics simulations, computational fluid dynamics, or other tasks, based on commands received from the processor 102.

The APU 116 can include workgroup processors (WGPs) 132.1-M; each WGP, e.g., 132.1, can have one or more SIMD units, e.g., 138.1.1-N, that can perform operations at the request of the processor 102 in a parallel manner according to a SIMD paradigm. The SIMD paradigm is one in which multiple processing elements share a single program control flow unit and program counter, and, thus, can execute the same program but on different data. In one example, each SIMD unit, e.g., 138.1.1, can include 64 lanes (i.e., threads), where each lane executes the same instruction at the same time as the other lanes in the SIMD unit, but executes that instruction on different data. Lanes can be switched off with predication, such as when not all the lanes are needed to execute a given instruction. Predication can also be used to execute programs with divergent control flows. Specifically, for programs with conditional branches or other instructions where control flow is based on calculations performed by an individual lane, predication of lanes corresponding to control flow paths not currently being executed, and serial execution of different control flow paths, allows for arbitrary control flow. In an aspect, each of the WGPs 132.1-M can have a local cache. In another aspect, multiple WGPs can share a cache.

The basic unit of execution in a WGP, e.g., 132.1, is a work-item. Typically, each work-item represents a single instantiation of a program that can be executed in parallel in a particular lane. Work-items can be executed simultaneously as a "wavefront" (or a "wave") on a single SIMD, e.g., 138.1.1. One or more waves can be run in a workgroup, each wave including a collection of work-items designated to execute the same program. A workgroup is executed by executing each of the waves that makes up the workgroup. The waves can also be executed sequentially on a single SIMD unit or partially or fully in parallel on different SIMD units, 138.1-N. Thus, a wave can be thought of as a collection of work-items that can be executed simultaneously on a single SIMD unit e.g., 138.1.1. Thus, if commands received from the processor 102 indicate that a particular program is to be parallelized to such a degree that the program cannot be executed on a single SIMD unit simultaneously, then that program can be broken up into waves which can be parallelized on two or more SIMD units (e.g., 138.1.1-N), serialized on the same SIMD unit (e.g., 138.1.1), or both parallelized and serialized as needed. A scheduler 136 can be configured to perform operations related to scheduling various waves on the different WGPs 132.1-M and their respective SIMD units.

The parallelism afforded by the WGPs 132.1-M is suitable, for example, for graphics related operations such as operations on pixel values (e.g., filter operations), operations on geometrical data (e.g., vertex transformations), and other graphics related operations. For example, an application 126, executing on the processor 102, can involve computations to be performed by the APU 116. The application 126 can use API provided by the kernel mode driver 122 to issue processing commands to the APU 116. The processing commands are then provided to the scheduler 136. The scheduler 136 translates the processing commands into computation tasks that are assigned to the WGPs 132.1-M for execution in parallel.

Figure 2:
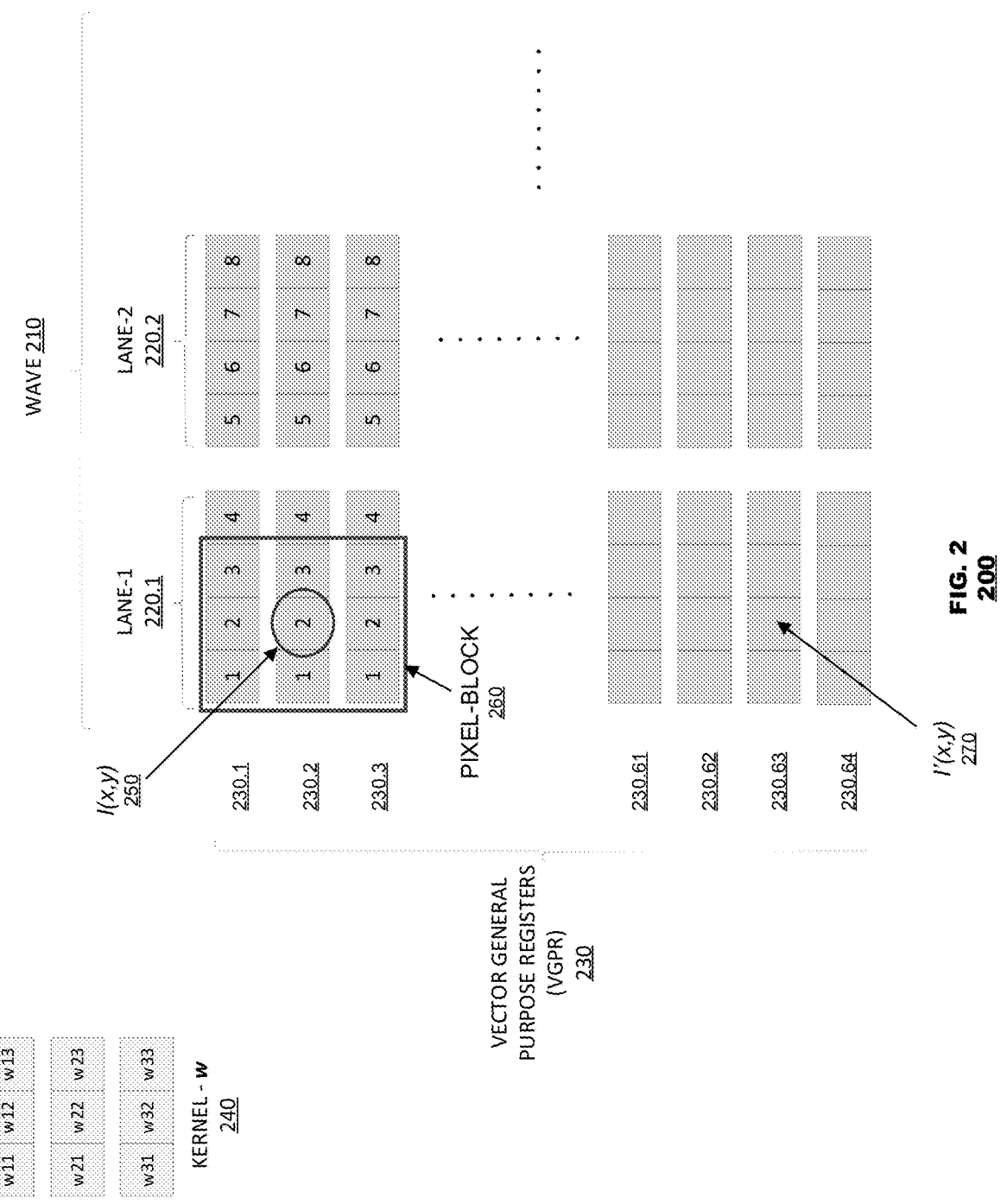
FIG. 2 illustrates an example dot product operation performed by a lane of a wave in a single-instruction-multiple-data (SIMD) unit, based on which one or more features of the disclosure can be implemented.

FIG. 2 illustrates an example dot product operation 200 performed by a lane of a wave in a SIMD unit, based on which one or more features of the disclosure can be implemented. The operation of two lanes 220.1-2 of a wave 210 are demonstrated in FIG. 2. A lane can have access to 64 VGPRs 230, each register can hold four bytes, for example. Typically, some of a lane's VGPRs, e.g., 230.1-3, can be used by the lane to store input data on which operations are to be performed and other registers, e.g., 230.63, can be used by the lane to store the outcome of the operations. The data stored in the VGPRs 230 of a wave's lanes may be any multidimensional data on which parallel operations are to be performs by the lanes. For example, a VGPR 230.2 of a lane 220.1 can hold four neighboring pixels of an image, each pixel value is represented by a byte. In another example, a VGPR 230.2 of a lane 220.1 can hold four components of a pixel, each component corresponding to a channel of the image (e.g., the three channels of an RGB (red, blue, and green) color model and a transparency channel) where each component value is represented by a byte. In the former example, consecutive VGPRs 230.1-3 of lane-1 220.1 can hold a four-by-three pixel-block of the image. The next four-by-three pixel-block in the image can be held by VGPRs 230.1-3 of lane-2 220.2.

In an aspect, lanes can be employed to perform a convolution operation on an image. Convolution operations involve multiplying a pixel-block of an image with a kernel of weights. For example, an image may be convolved with a 3×3 kernel 240, that is, for each pixel, a dot product is applied between the kernel's elements and a 3×3 pixel-block centered at the pixel's location in the image. Accordingly, if lane-1 220.1 is to execute a convolution operation on a pixel I(x,y) 250 of an image I, then, first, the lane 220.1 should have access to the kernel 240 and the 3×3 pixel-block that is centered at the pixel 250. These data can be loaded (typically by the respective WGP 132) into the lane's VGPRs to allow for fast access during operation. For example, as explained above, an image region of 4×3 pixels may be stored in VGPRs 230.1-3 of lane-1. To convolve pixel I(x,y) 250, for example, the 3×3 pixel-block 260 that is centered at the pixel 250 is multiplied by the kernel, w 240, using a dot product operation:

$$I'(x, y) = \sum_{n=-1}^{1} \sum_{m=-1}^{1} I(x + n, y + m) \cdot w(n + 1, m + 1).$$

The result of the dot product, I'(x,y), can then be stored in a VGPR of lane-1 that is used to store the output (convolved)

image pixels. For example, VGPR 230.63 can be used to store I'(x,y) in its second byte 270, as shown in FIG. 2. Similarly, the other pixels in VGPR 230.2 of lane-1 can be convolved with the kernel 240. For example, the pixel to the right of pixel I(x,y) 250, that is, the pixel that is stored in the third byte of VGPR 230.2 may be convolved and have the resulting dot product stored in the third byte of VGPR 230.63.

Figure 3:
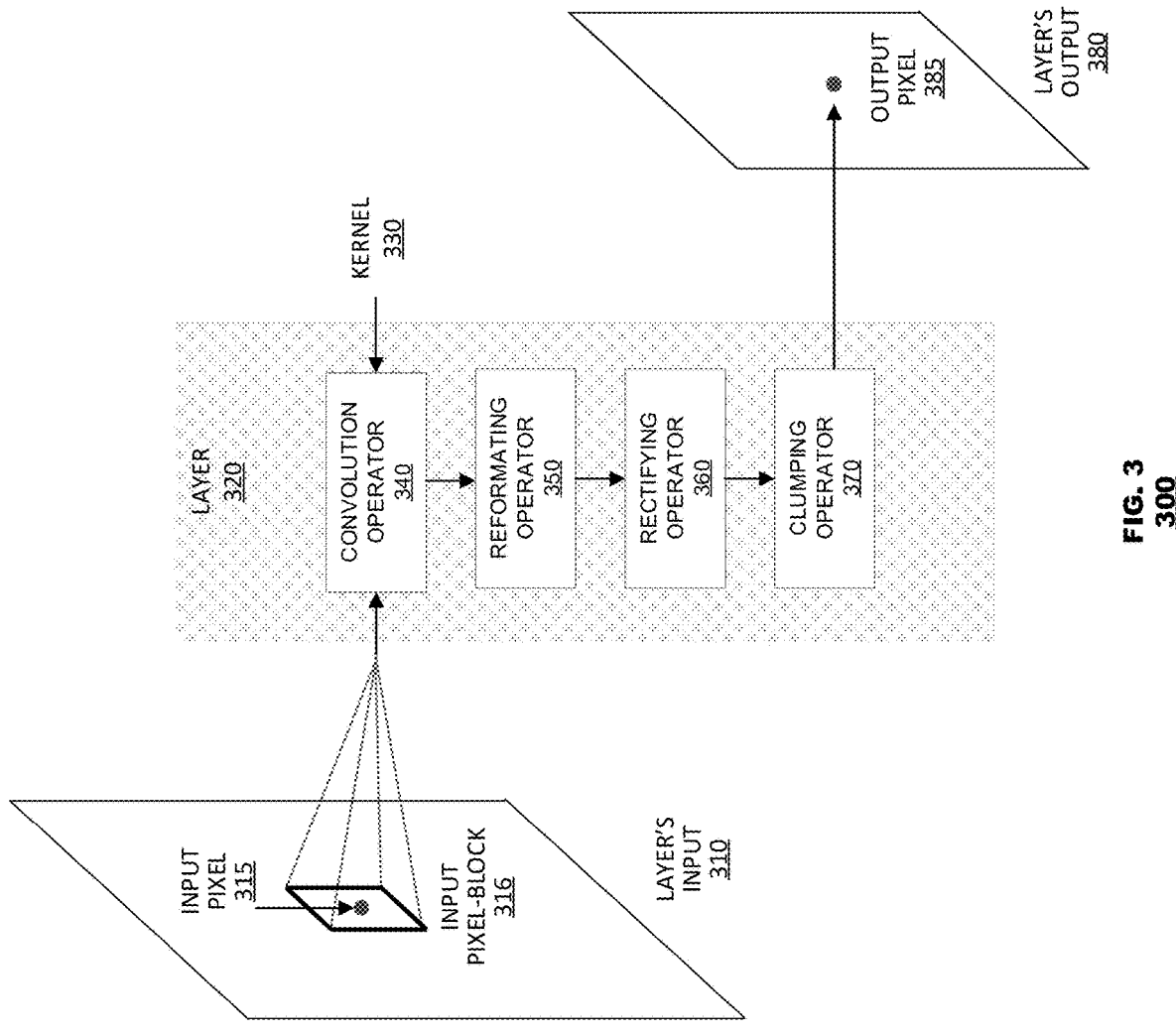
FIG. 3 illustrates an example layer processing of a CNN, based on which one or more features of the disclosure can be implemented.

FIG. 3 illustrates an example layer processing of a CNN, based on which one or more features of the disclosure can be implemented. Generally, the input of a layer 320 may be a multidimensional array of integer or floating point numbers, such as a three-dimensional (3D) volume or a two-dimensional (2D) matrix. As demonstrated in FIG. 3, the input 310 of the layer 320 is one channel of a 2D image where each pixel of the image can be an 8-bit integer. The output 380 of the layer 320 is another 2D image that may be of the same or a different size. Operators that are typically applied to the input of the layer 320 include a convolution operator 340 and transitional operators, such as a reformatting operator 350, a rectifying operator 360, and a clamping operator 370. Thus, for each pixel 315 of the input image 310, the convolution operator applies a dot product between a pixel-block 316 at the center of the pixel 315 and a kernel 330, resulting in a corresponding convolved pixel. Such a dot product can be performed by a lane as described in reference to FIG. 2. Transitional operations are performed on each of the image's 310 convolved pixels to generate an output image 380 (to be fed to the next layer of the CNN) as follows. Each pixel, e.g., 315, after being convolved 340, can be reformatted 350. For example, a convolved pixel can be multiplied by $2^{-14}$ to scale it to the smallest representable floating point (FP16) and a bias (FP16 value) can be added to it. The reformatted pixel can also be rectified 360. For example, a rectified linear unit (ReLU) can be employed, wherein if the input to the rectifier is negative then the output is set to zero, otherwise the output is the same as the input. In another example, a leaky rectified linear unit (LReLU) can be employed, wherein if the input to the rectifier is negative then the output is divided by four, otherwise the output is the same as the input. The rectified pixel can then be clamped 370 to set its value within a range, for example, the −127 to 128 range of an 8-bit signed integer. The clamped pixel results in the output pixel 385.

Figure 4:
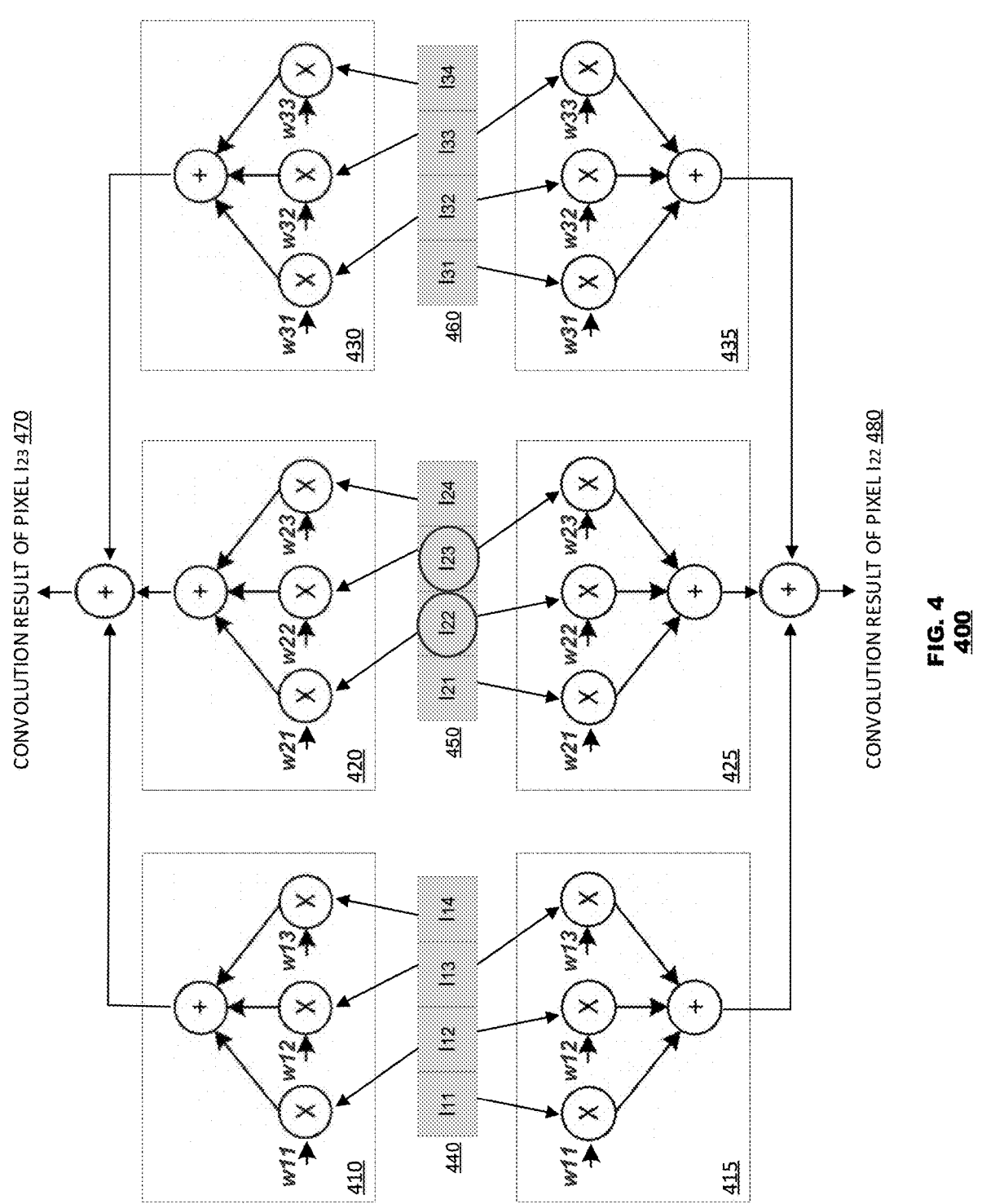
FIG. 4 and FIG. 5 illustrate an example dual dot product instruction, including a convolution operation (FIG. 4) and transitional operations (FIG. 5), based on which one or more features of the disclosure can be implemented.
Figure 5:
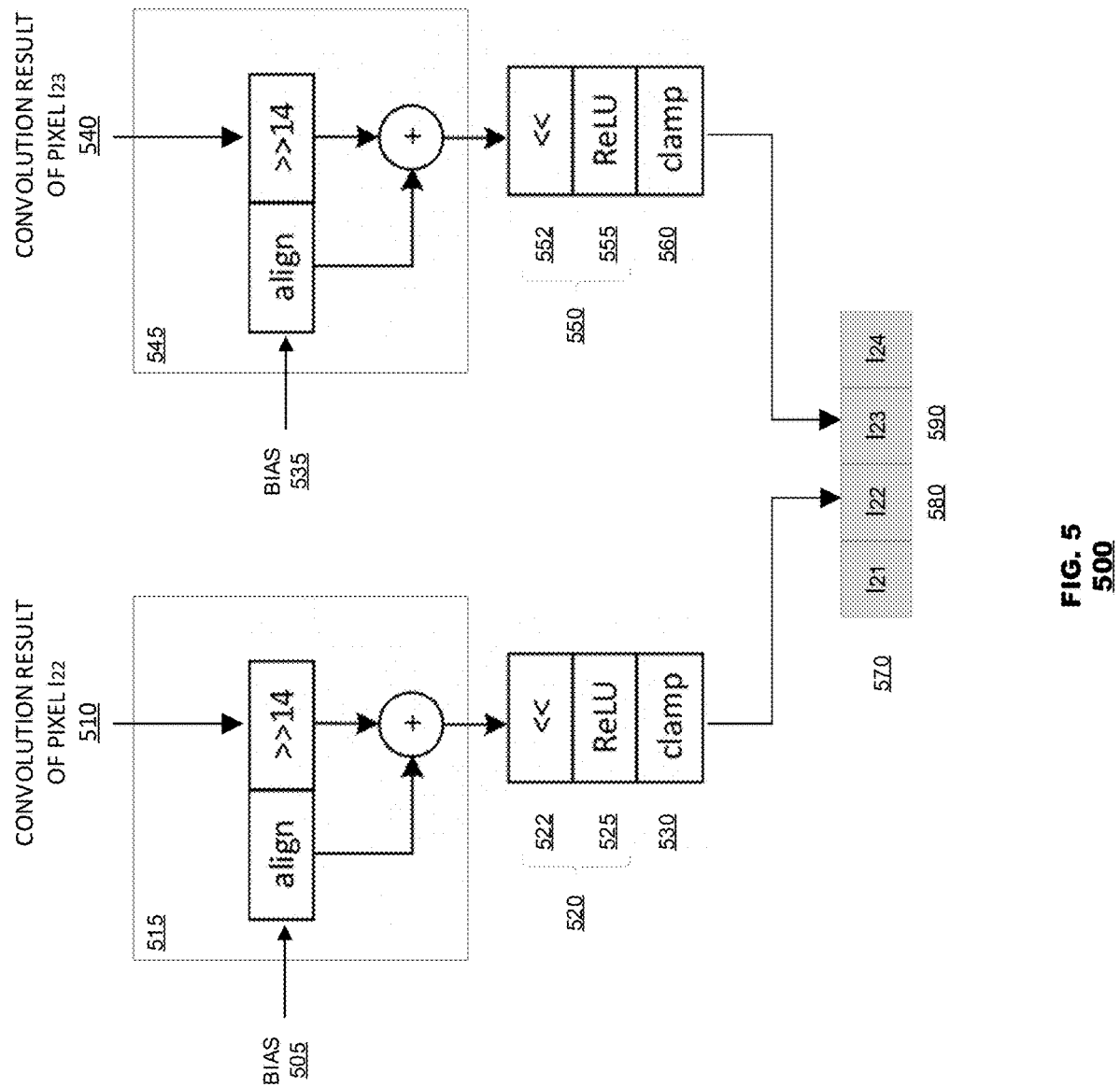

As mentioned above, the transitional operations (reformatting 350, rectifying 360, and clamping 370) that transform the output of the convolution operation 340 into an output 380 that is ready for processing by the next layer of the CNN consume significant computation time that rivals if not surpasses the time it takes to perform the convolution 340. Disclosed herein are instructions that are designed to execute the convolution operation and the transitional operations in one computer cycle. FIGS. 4 and 5 together demonstrate an instruction, namely a dual dot product instruction, that is designed to execute a convolution operation (FIG. 4) and transitional operations (FIG. 5) on two pixels of an image in one computer cycle, as described in detail below.

FIG. 4 and FIG. 5 illustrate an example dual dot product instruction, including a convolution operation (FIG. 4) and transitional operations (FIG. 5), based on which one or more features of the disclosure can be implemented. FIG. 4 demonstrates a dual dot product instruction that operates on two neighboring pixels: pixel $I_{22}$ and pixel $I_{23}$, stored in the second and third bytes of VGPR 450 (encircled in FIG. 4). To facilitate the convolution of pixels $I_{22}$ and $I_{23}$, data that are stored in the VGPRs 440, 450, 460 include two 3×3 pixel-blocks. The first pixel-block—containing pixels {In, $I_{12}$, $I_{13}$; $I_{21}$, $I_{22}$, $I_{23}$; $I_{31}$, $I_{32}$, $I_{33}$}—is used for the convolution of pixel $I_{22}$. The second pixel-block—containing pixels {$I_{12}$, $I_{13}$, $I_{14}$; $I_{22}$, $I_{23}$, $I_{24}$; $I_{32}$, $I_{33}$, $I_{34}$}—is used for the convolution of pixel $I_{23}$. Three dot product units 415, 425, 435 are used to perform dot product operations on the first, second, and third lines of the first pixel block, respectively. The sum of these dot products constitutes the convolution result of pixel $I_{22}$, 480. Likewise, the three dot product units 410, 420, 430 are used to perform dot product operations on the first, second, and third lines of the second pixel block, respectively. The sum of these dot products constitutes the convolution result of pixel $I_{23}$, 470. Notice that the dot product units 410, 415, 420, 425, 430, 435 use weights of a 3×3 kernel: {w11, w12, w13; w21, w22, w23; w31, w32, w33}. For example, dot product unit 410 output is $w11 \cdot I_{12} + w12 \cdot I_{13} + w13 \cdot I_{14}$.

Transitional operations are further applied to the convolution results for pixel $I_{22}$ 480 and pixel $I_{23}$ 470, as show in FIG. 5. In FIG. 5, the convolution results for pixel $I_{22}$ 510 and pixel $I_{23}$ 540 can be reformatted 515, 545, rectified 520, 550, and clamped 530, 560. For example, the convolution value of pixel $I_{22}$ 510 can be reformatted into a floating-point format. That is, the integer value of 122 can be right shifted by 14 bits, to allow for 14 bits of fraction. A bias value 505 (e.g., a floating-point number) can be aligned to the fraction bits of the reformatted $I_{22}$ and can be added to it. The bias value can be either a constant value or a value stored in a respective lane's VGPR. Similarly, the convolution value of pixel $I_{23}$ 540 can be reformatted and a bias value 535 may be added to it. The reformatted values may then be rectified 520, 550, by applying a shift operator 522, 552, and an ReLU (or a LReLU) operator 525, 555. Then, the rectified values can be clamped 530, 560, resulting in the output pixels 580, 590 that are stored in a destination VGPR 570.

Figure 6:
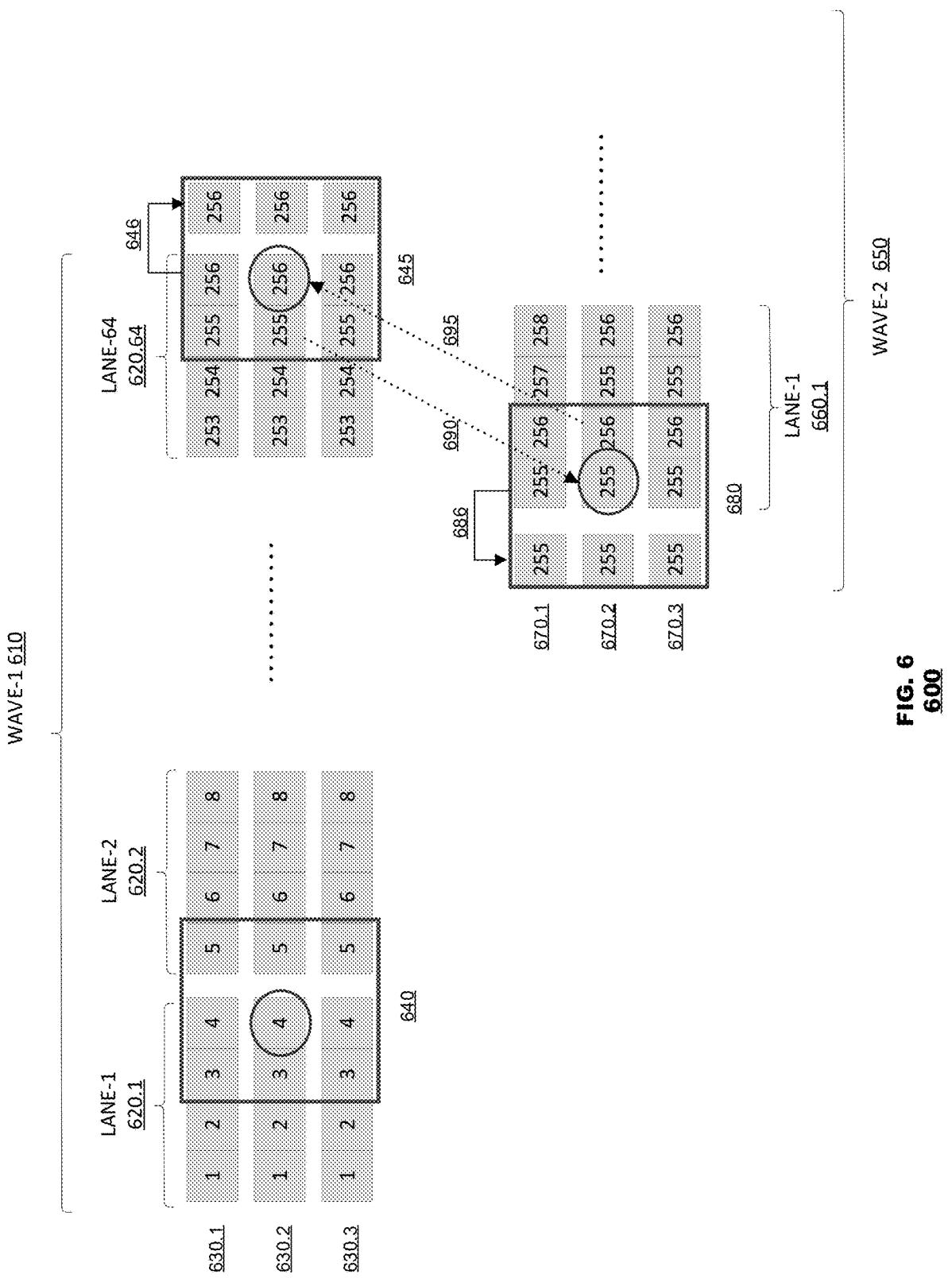
FIG. 6 illustrates example dot product operations performed by lanes of waves in SIMD units, based on which one or more features of the disclosure can be implemented.

FIG. 6 illustrates example dot product operations performed by lanes of waves in SIMD units, based on which one or more features of the disclosure can be implemented. FIG. 6 demonstrates convolution operations of pixels that are located at the boundary (e.g., pixel $I_{21}$ or $I_{24}$ in FIG. 4). Generally, the number of waves that are required to process an image would be the number of pixels to be processed in an image divided by the size of the wave. The size of a wave is the number of lanes (e.g., 64) times the number of pixels each lane is assigned for processing (e.g., 4 pixels). Two waves are shown in FIG. 6. Each wave is assigned with the processing of a segment of an image line. For example, wave-1 610 processes a first segment of 256 pixels and wave-2 650 processes a second segment of 256 pixels. Each lane of a wave (i.e., the shown lanes 620.1-64 of wave-1 610 and lane-1 660.1 of wave-2 650) processes four pixels of an image line. For example, lane-1 620.1 is assigned with the processing of pixels 1-4 of image line 630.2, and lane-2 620.2 is assigned with the processing of pixels 5-8 of image line 630.2.

As explained, for example with respect to FIG. 2, to convolve a pixel, the lane needs access to a pixel-block centered at the pixel. Thus, a lane has stored in its VGPRs not only the four of pixels it has to compute a convolution on (in image line 630.2), but also the four pixels above (in image line 630.1) and the four pixels below (in image line 630.3). However, pixel blocks that are required by a lane to convolve boundary pixels contain pixels that are not stored by the respective lane. For example, to convolve pixel 4 of line 630.2, lane-1 620.1 requires access to pixel 5 of image lines 630.1, 630.2, and 630.3. In an aspect, a lane (such as lane-1 620.1) can access pixel data stored in the VGPRs of another lane in the wave (such as the VGPRs of lane-2 620.2 of wave-1 610).

Similarly, to convolve pixel 256 of line 630.2, lane-64 620.64 requires access to pixel 257 of image lines 630.1, 630.2, and 630.3. However, since pixel 256 is at the end of the image segment that has been assigned to wave-1 610, these pixels are not accessible to lane-64. Thus, in an aspect, instead of loading from memory the missing right column of pixel-block 645 (i.e., loading pixel 257 of image lines 630.1, 630.2, and 630.3), lane-64 620.64 can pad pixel 256 of image lines 630.1, 630.2, and 630.3 into the right column of pixel-block 645 (as shown by the arrow 646 in FIG. 6). This padding, although it saves the need to load data from memory to lane 64's VGPRs, contaminates the convolution result of boundary pixels such as pixel 256 of image line 630.2. A solution is to maintain a two-pixel overlap between the first and the second segments that are assigned to two neighboring waves. For example, as shown in FIG. 6, pixels 255 and 256 of lane-64 of wave-1 are also loaded and processed by lane-1 of wave-2. If padding is also performed to complete the pixel block 680 that is needed to compute the convolution of pixel 255 in image line 670.2 (as shown by the arrow 686 in FIG. 6), then the convolution result for this pixel will also be contaminated. However, note that pixel 255 of line 630.2 and pixel 256 of line 670.2 are not boundary pixels in their respective lane-64 620.64 and lane-1 660.1, and thus their respective convolution result is valid. In an aspect, lane-1 and lane-64 can switch the convolution results; that is, lane-64 can replace 695 its contaminated convolution result for 256 (of line 630.2) with the valid result for 256 (of line 670.2) computed by lane-1; and, lane-1 can replace 690 its contaminated convolution result for 255 (of line 670.2) with the valid result for 255 (of line 630.2) computed by lane-64.

Figure 7:
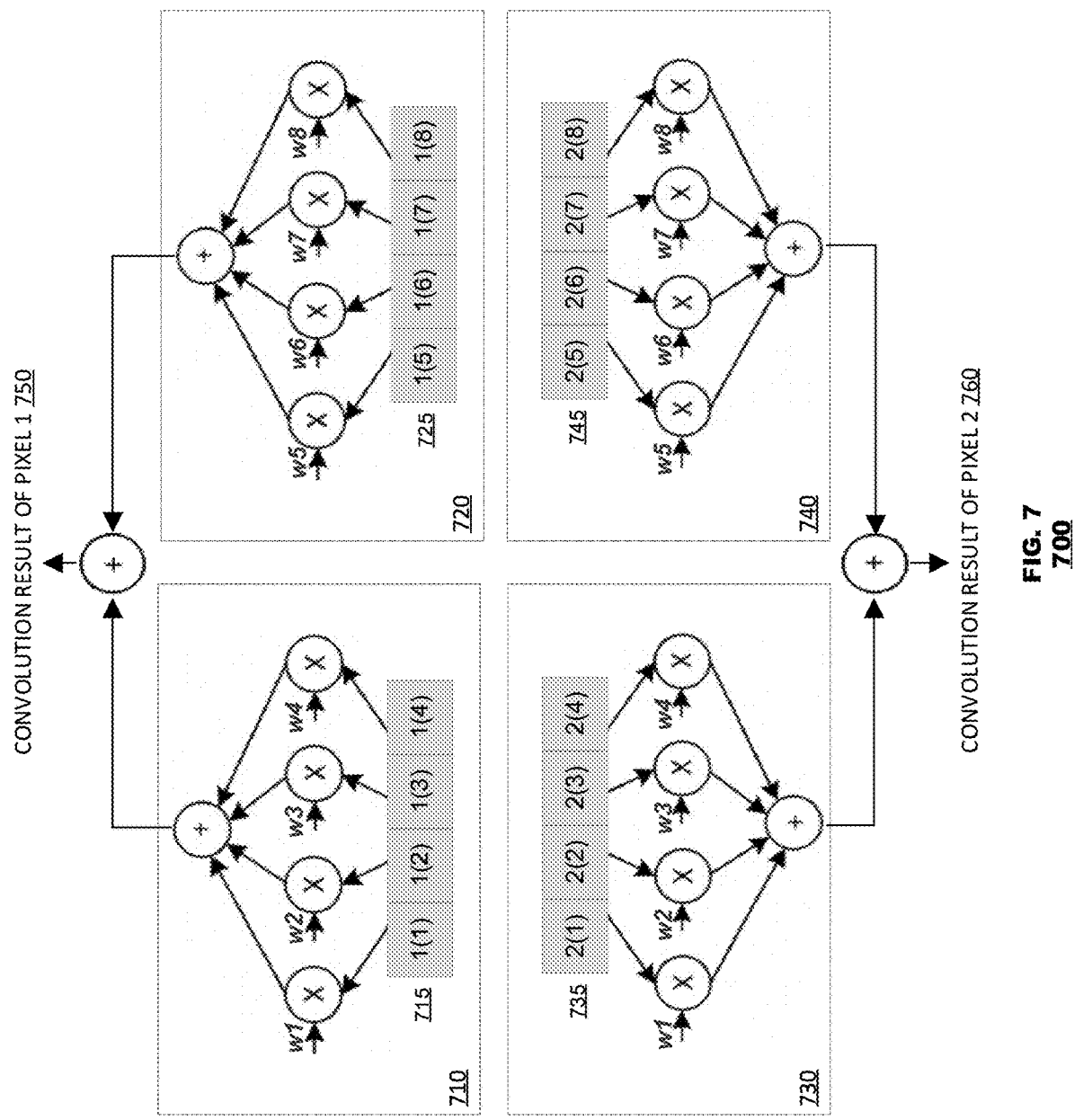
FIG. 7 illustrates another example dual dot product instruction, based on which one or more features of the disclosure can be implemented.

FIG. 7 illustrates another example dual dot product instruction, based on which one or more features of the disclosure can be implemented. The dual dot product instruction, shown in FIG. 7, also includes transitional operations as shown in FIG. 5. In an aspect, the instruction, shown in FIG. 7, can be applied to perform a dot product on a data matrix of two rows and four columns. For example, this instruction may be applied to a convolution across an image's channels (namely point-wise convolution). FIG. 7 demonstrates performing a dual convolution for an image with eight channels. Thus, a first pixel's channels are stored in a first VGPR 715, denoted 1(1), 1(2), 1(3), and 1(4) and a second VGPR 725, denoted 1(5), 1(6), 1(7), and 1(8). The second pixel's channels are stored in a first VGPR 735, denoted 2(1), 2(2), 2(3), and 2(4) and a second VGPR 745, denoted 2(5), 2(6), 2(7), and 2(8). Four dot product units 710, 720, 730, and 740 are used to perform the dual dot product operations. The two units 710, 720, execute the dot product of the first pixel with a kernel, that is, the sum of: w1 1(1), w2 1(2), w3 1(3), w4 1(4), w5 1(5), w6 1(6), w7 1(7), and w8 1(8). This dot product constitutes the convolution result of the first pixel 750 that can be fed into the transitional operators (illustrated in FIG. 5, e.g., the reformatting operator 515, the rectifying operator 520, and the clamping operator 530), the result of which can be stored in one of the lane's VGPR, e.g., 580. The two units 730, 740, execute the dot product of the second pixel with a kernel, that is, the sum of: w1 2(1), w2 2(2), w3 2(3), w4 2(4), w5 2(5), w6 2(6), w7 2(7), and w8 2(8). This dot product constitutes the convolution result of the second pixel 760 that can be fed into the transitional operators (illustrated in FIG. 5, e.g., the reformatting operator 545, the rectifying operator 550, and the clamping operator 560), the result of which can be stored in one of the lane's VGPR, e.g., 590.

In an aspect, in a first stage, the dual dot product instruction of FIG. 4 can be used to apply convolution to pixels within each channel of an image (namely, depth-wise convolution), resulting in an output image for each channel. Then, in a second stage, the dual dot product instruction of FIG. 7 can be used to apply convolution across the channels (namely, point-wise convolution), receiving as an input the outputs produced by the first stage.

FIG. 8 is a flow chart of an example method 800 for the application of a dual dot product instruction, based on which one or more features of the disclosure can be implemented. The method 800, employed by a lane of a wave executing on a SIMD unit, begins in step 810 with the loading of input data into the VGPRs of the lane. Then a dot product operation can be performed during one computer cycle in step 820. The dot operation includes convolving a data element of the input data and then applying transitional operations on the convolved data element. A second dot product operation can be performed during the one computer cycle in step 830. The second dot operation can include convolving a second data element of the input data and then applying transitional operations on the convolved second data element. The dot operations, of step 820 and step 830, can be performed by applying dual product instructions, as described in reference to FIGS. 4-7.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing operations in parallel comprising:

loading, by a lane of a wave executing on an accelerated processing unit (APU), input data into vector general purpose registers (VGPRs) of the lane; and in response to a single fused dot-product instruction, performing, by the lane, within a single clock cycle of the lane, a fused operation that generates output data, the fused operation comprising:

convolving a data element of the input data, using operands resident in the VGPRs of the lane, to generate an intermediate data element; and in the same single clock cycle, applying one or more transitional operations including at least a rectifying operation to the intermediate data element, generating an output data element of the output data.

2. The method of claim 1, further comprising:

performing, by the lane, within the same single clock cycle of the lane, a dot product operation, comprising:

convolving a second data element of the input data, generating a second intermediate data element, and applying the one or more transitional operations to the second intermediate data element, generating a second output data element of the output data.

3. The method of claim 1, wherein the one or more transitional operations further include one of a reformatting operation or a clamping operation.

4. The method of claim 1, wherein the input data is an input to a layer of a convolutional neural network and the output data is the output of the layer.

5. The method of claim 1, wherein:

the input data comprise pixels of an image, including a pixel and a pixel-block, centered at the pixel; and the convolving comprises a dot product of the pixel-block and a kernel of weights, the pixel-block and the kernel are stored in the VGPRs of the lane.

6. The method of claim 5, wherein when a first portion of the pixel-block is stored in the VGPRs of the lane and a second portion of the pixel-block is stored in VGPRs of another lane in the wave, the lane accesses the second portion from the VGPRs of the other lane.

7. The method of claim 5, wherein when a first portion of the pixel-block is stored in the VGPRs of the lane and a second portion of the pixel-block is not stored in the VGPRs of the lane, the data from the second portion is replaced by data from the first portion.

8. The method of claim 7, wherein the generated output data is replaced with output data that was generated by a lane of a second wave.

9. The method of claim 1, wherein:

the input data are channel data of a pixel of an image, and the convolving comprises a dot product of the channel data and a kernel of weights, the channel data and the kernel are stored in the VGPRs of the lane.

10. A circuitry for executing operations in parallel, comprising:

at least one processor; and memory storing instructions that, when executed by the at least one processor, cause the circuitry to:

load, by a lane of a wave executing on the at least one processor, input data into VGPRs of the lane; and in response to a single fused dot-product instruction, perform, by the lane, a within a single clock cycle of the lane, a fused operation that generates output data, the fused operation comprising:

convolving a data element of the input data, using operands resident in the VGPRs of the lane, to generate an intermediate data element; and in the same single clock cycle, applying one or more transitional operations including at least a rectifying operation to the intermediate data element, generating an output data element of the output data.

11. The circuitry of claim 10, further comprising instructions that cause the circuitry to:

perform, by the lane, within the same single clock cycle of the lane, a dot product operation, comprising:

convolving a second data element of the input data, generating a second intermediate data element, and applying the one or more transitional operations to the second intermediate data element, generating a second output data element of the output data.

12. The circuitry of claim 10, wherein the one or more transitional operations further includes are one of a reformatting operation or a clamping operation.

13. The circuitry of claim 10, wherein the input data is an input to a layer of a convolutional neural network and the output data is the output of the layer.

14. The circuitry of claim 10, wherein:

the input data comprise pixels of an image, including a pixel and a pixel-block, centered at the pixel; and the convolving comprises a dot product of the pixel-block and a kernel of weights, the pixel-block and the kernel are stored in the VGPRs of the lane.

15. The circuitry of claim 14, wherein when a first portion of the pixel-block is stored in the VGPRs of the lane and a second portion of the pixel-block is stored in VGPRs of another lane in the wave, the lane accesses the second portion from the VGPRs of the other lane.

16. The circuitry of claim 14, wherein when a first portion of the pixel-block is stored in the VGPRs of the lane and a second portion of the pixel-block is not stored in the VGPRs of the lane, the data from the second portion is replaced by data from the first portion.

17. The circuitry of claim 16, wherein the generated output data is replaced with output data that was generated by a lane of a second wave.

18. The circuitry of claim 10, wherein:

the input data are channel data of a pixel of an image, and the convolving comprises a dot product of the channel data and a kernel of weights, the channel data and the kernel are stored in the VGPRs of the lane.

19. A non-transitory computer-readable medium comprising instructions executable by at least one processor to perform a method for executing operations in parallel, the method comprising:

loading, by a lane of a wave executing on an accelerated processing unit (APU), input data into VGPRs of the lane; and in response to a single fused dot-product instruction, performing, by the lane, within a single clock cycle of the lane, a fused operation that generates output data, the fused operation comprising:

convolving a data element of the input data, using operands resident in the VGPRs of the lane, to generate an intermediate data element; and in the same single clock cycle, applying one or more transitional operations including at least a rectifying operation to the intermediate data element, generating an output data element of the output data.

20. The medium of claim 19, further comprising:

performing, by the lane, within the same single clock cycle of the lane, a dot product operation, comprising:

convolving a second data element of the input data, generating a second intermediate data element, and applying the one or more transitional operations to the second intermediate data element, generating a second output data element of the output data.

* * * * *